United States Patent Office 2,921,103
Patented Jan. 12, 1960

2,921,103

PRODUCTION OF TERMINAL BOND OLEFINS FROM NON-TERMINAL BOND OLEFINS

Emory W. Pitzer, Bartlesville, Okla., assignor to Phillips Petroleum Company, a corporation of Delaware No Drawing. Application July 29, 1957
Serial No. 674,594

6 Claims. (Cl. 260—683.2)

This invention relates to the isomerization of organic compounds, more particularly to catalytic shifting of double bonds to produce an olefin containing a terminal double bond from an olefin containing no terminal double bond.

While it is known to shift double bonds in non-terminal bond olefins to form terminal bond olefins by catalytic shifting, the prior art methods have been limited to low temperatures since higher temperatures employed in the prior art method result in undesirable side effects such as further dehydrogenation and cracking. However, higher temperatures favor the production of 1-olefins as is exemplified by the equilibrium data of Table I, below.

TABLE I

| Temperature, °F. | Equilibrium Concentration in Mol Percent | |
|---|---|---|
| | Butene-1 | Butene-2 |
| 80 | 2.9 | 97.1 |
| 260 | 7.7 | 42.3 |
| 440 | 13.7 | 86.3 |
| 620 | 19.8 | 80.2 |
| 800 | 25.6 | 74.4 |
| 980 | 30.3 | 69.7 |
| 1,160 | 34.9 | 65.1 |
| 1,340 | 38.5 | 61.5 |

While the above table shows equilibrium data for butene-1 and butene-2, it is known to the art that higher temperatures are favorable to formation of other 1-olefins in a similar manner.

These 1-olefins produced by the method of this invention are particularly useful in preparing polymers and particularly copolymers with ethylene in the presence of chromium oxide catalyst as disclosed in the copending application of Hogan et al. filed March 26, 1956, and having Serial No. 573,877, now U. S. Patent No. 2,825,721. In that application a process is disclosed for producing novel polymers of 1-olefins by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia, and thoria. Also, these 1-olefins are particularly useful for preparing polymers by other catalyst systems, e. g., the organometallic catalyst as disclosed by Karl Ziegler in Belgian Patent 533,362, November 16, 1954.

An object of this invention is to provide a method of producing terminal bond olefins from non-terminal bond olefins. Another object of this invention is to provide a method of catalytically shifting double bonds in an aliphatic hydrocarbon at a high temperature, thereby favoring the formation of 1-olefins. Other objects, advantages and features of this invention will be obvious to those skilled in the art having been given this disclosure.

This application is a continuation-in-part of my application Serial No. 614,335, filed October 8, 1956, now abandoned, for "Production of 1-Olefins."

According to this invention a non-terminal bond olefin is isomerized to form a terminal bond olefin by contacting same with a chromic oxide ($Cr_2O_3$-alumina catalyst at a temperature of at least 950° F. and in the presence of at least 1 mol of steam per mol of said non-terminal bond olefin.

This invention can be practiced with conventional equipment and comprises the steps of contacting a non-terminal bond olefin with the catalyst in the presence of steam and subsequently separating a terminal bond olefin from the effluent product. The contacting is ordinarily effected in a fixed bed reactor and separation of the effluent effected by condensing the steam from the hydrocarbon and separating the alpha olefin present in the hydrocarbon. The non-terminal bond olefins recovered in the separation are ordinarily recycled to the process. After extended use, oxidative regeneration of the catalyst is ordinarily effected. By this means, any carbonaceous deposits accumulating on the catalyst are removed. Process cycle lengths are ordinarily from 10 to 100 hours. The contacting of the hydrocarbon with the catalyst can be carried out at a temperature between 950 and 1300° F. and preferably within the range of 1025 and 1250° F. As has been indicated, the higher temperatures are thermodynamically more favorable to 1-olefin formation than are lower temperatures, however, excessively high temperatures will cause decomposition of the feed. By operating within the above temperature ranges under the conditions of this invention, satisfactory conversion is obtained without excessive decomposition. In carrying out this invention, 1 to 30 mols of steam per mol of hydrocarbon can be employed while I prefer to use from 4 to 15 mols of steam per mol of hydrocarbon. While the hourly space velocity can vary over a wide range, say from 50 to 5000, I prefer to use a space velocity within the range of 100 to 2000 volumes per volume. I will ordinarily employ a pressure from atmospheric to 100 p.s.i.g. although higher or lower pressures can be employed. This range of pressures is ordinarily the most convenient and practical range, though no criticality is attached to pressure.

The catalyst employed in this invention consists essentially of 5 to 60 weight percent chromia associated with alumina as the remainder of the catalyst. This catalyst can be prepared by coprecipitation, impregnation, mixing or any other method known to the art for preparing such catalyst.

This process is most suitable for use with non-terminal bond olefins with four to six carbons in the longest straight chain. However, higher olefins, say up to eight carbon atoms in the straight chain, can be used; but the thermodynamic equilibrium is less favorable in that lower concentration of 1-olefins are possible. Examples of such non-terminal bond olefins include butene-2, 2-methylbutene-2, pentene-2, 3-methylpentene-2, hexene-2, hexene-3, 3-ethylhexene-2, 2-octene, 3-octene, 4-octene, 4-ethyloctene-3 and the like.

This invention will be further illustrated by the following examples wherein butene-2 is isomerized to butene-1. This example is to illustrate the invention and is not to be construed as limiting in any way. It should be understood that other olefins can be isomerized in the same manner and other temperatures, pressure, steam to hydrocarbon ratios, space velocities, catalyst prepared by other methods, etc., within the ranges described above are operable.

*Example I*

A catalyst was prepared by impregnating gamma alumina tablets to a controlled depth with an aqueous solution of chromic acid, drained, dried, calcined at 1000° F. for about 12 hours, and calcined at 1750° F. for 28 hours. The finished catalyst contained approximately 20 percent $Cr_2O_3$ and 80 percent $Al_2O_3$. It was substantially completely a solid solution of chromia and alpha alumina. To prepare an impregnated catalyst of controled depth, alumina is finely ground and mixed with a binder such as hydrogenated corn oil after which the material is pelleted. These pellets are partially calcined at a temperature of 1100° F. for ten minutes after which the pellets were cooled and immersed in the chromic acid solution. This first calcination removed only the binder near the catalyst surface so that the solution did not penetrate to the center of the pellet during the immersion. The high temperature calcination to which the pelelts were subjected after immersion removed the remainder of the binder so that the finished catalyst was completely porous.

A hydrocarbon stream of 99+% butene-2 was passed over the catalyst as prepared above at a space velocity of 400, a 12 to 1 steam to butene-2 ratio at 1130° F. and at atmospheric pressure in a stainless steel reactor. The data from this run are given below:

| | | | |
|---|---|---|---|
| Total Catalyst Age, Hours | 25 | 117 | 143 |
| Hours since Steaming [1] | 25 | 23 | 4 |
| Product, Mol Percent: | | | |
| $CO_2$ | 0.23 | 0.31 | 0.37 |
| $H_2$ | 1.04 | 0.46 | 0.80 |
| $CH_4$ | 0.29 | 0.28 | 0.37 |
| $C_2H_4$ | 0.13 | 0.09 | 0.04 |
| $C_4H_6$ | 1.80 | 1.07 | 1.36 |
| Butene-1 | 37.15 | 38.12 | 37.32 |
| Butene-2 | 59.36 | 59.67 | 59.74 |

[1] After each approximately 24 hours of isomerization, the butene-2 feed was stopped and the catalyst was steamed for 2 hours. Thereafter the butene-2 feed was started again for another 24-hour period.

The data show good isomerization up to 143 hours without loss of activity, indicating that the catalyst will perform satisfactorily for 200 hours or more without steaming and indicates a probable catalyst life of 6 months or even a year or more.

*Example II*

Two runs were made similar to Example I except no steam was present. One of these runs was at a space velocity of 400 as used in Example I and the other at 5200 space velocity. In both cases, the reactor plugged with carbon within two hours of operation. Upon removal from the reactor, the catalyst was contaminated with iron oxide which apparently had come from the stainless steel reactor. This did not occur in any significant amount when steam was used in the process.

*Example III*

Since the catalyst was contaminated with iron, two additional runs were made under the conditions of Example II except a glass reactor was used. Less than 2 percent of the butene-2 was isomerized to butene-1 at either space velocity and either before or after steaming. During the steaming period, air was passed over the catalyst to remove the coke deposited thereon. At both space velocities, the weight of carbon deposited on the catalyst was in excess of 15 percent of the catalyst weight.

These runs were made by operating for a period of 48 hours and sampling the effluent, regenerating the catalyst, operating for 4 hours, and then taking another sample. In this way, effluent samples before and after steaming and regenerating the catalyst were obtained.

From the above runs, it can be seen that relatively high conversions of non-terminal bonds to terminal bond olefins can be obtained when contacting the non-terminal bond olefin with a chromia-alumina catalyst at relatively high temperatures in the presence of steam. Those skilled in the art will see many modifications which can be made and obtain the advantages without departing from the scope of this invention.

I claim:

1. A process for isomerizing a non-terminal bond olefin to a terminal bond olefin which comprises contacting a stream of non-terminal bond olefin of 4 to 6 carbon atoms in the longest straight chain with a catalyst consisting essentially of chromic oxide associated with alumina at a temperature in the range 950° F. to 1300° F. and in the presence of from 1 to 30 mols of steam per mol of said non-terminal bond olefin.

2. A process for isomerizing a non-terminal bond olefin to a terminal bond olefin which comprises contacting a hydrocarbon stream comprising a non-terminal bond olefin of 4 to 6 carbon atoms in the longest straight chain with a catalyst consisting essentially of 5 to 60 weight percent chromia and the balance alumina at a temperature in the range 950° F. to 1300° F. in the presence of from 1 to 30 mols of steam per mol of hydrocarbon and thereafter separating 1-olefin from the effluent from said contacting.

3. A process for isomerizing a non-terminal bond olefin to a terminal bond olefin which comprises contacting a hydrocarbon stream comprising a non-terminal bond olefin of 4 to 6 carbon atoms in the longest straight chain at a space velocity in the range of 50 to 5000 with a catalyst consisting essentially of 5 to 60 weight percent chromia and the remainder alumina at a temperature in the range of 950 and 1300° F. in the presence of steam in a mol ratio of steam to hydrocarbon in the range of 1 to 1 to 30 to 1 and thereafter separating 1-olefin from the effluent from said contacting.

4. A process for isomerizing a non-terminal bond olefin to a terminal bond olefin which comprises passing a non-terminal bond olefin of 4 to 6 carbon atoms in the longest chain at a space velocity within the range of 100 to 2000 with a catalyst consisting essentially of from 5 to 60 weight percent chromia and the remainder alumina at a temperature in the range of 1025 and 1250° F. along with steam in a mol ratio in the range of 4/1 and 15/1 steam per mol of said non-terminal bond olefin and thereafter separating 1-olefin from the effluent from said catalyst.

5. The process of claim 4 wherein the non-terminal bond olefin is butene-2, the terminal bond olefin is butene-1, and the catalyst consists of alpha alumina impregnated with chromic oxide.

6. The process of claim 1 wherein the non-terminal bond olefin is butene-2 and the said terminal bond olefin is butene-1.

References Cited in the file of this patent

UNITED STATES PATENTS

| | | |
|---|---|---|
| 2,265,641 | Grosskinsky et al. | Dec. 9, 1941 |
| 2,342,248 | Burk | Feb. 22, 1944 |
| 2,353,552 | Drennan | July 11, 1944 |
| 2,399,895 | Seyfried et al. | May 7, 1946 |
| 2,403,671 | Matuszak | July 9, 1946 |
| 2,626,288 | Ronayne | Jan. 20, 1953 |
| 2,754,345 | Kirshenbaum | July 10, 1956 |
| 2,785,209 | Schmetterling et al. | Mar. 12, 1957 |